(12) United States Patent
Imai

(10) Patent No.: US 8,878,786 B2
(45) Date of Patent: Nov. 4, 2014

(54) IMAGE PROCESSING APPARATUS, IMAGE PROCESSING METHOD, AND STORAGE MEDIUM

(75) Inventor: Ayato Imai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 13/348,300

(22) Filed: Jan. 11, 2012

(65) Prior Publication Data

US 2012/0194433 A1   Aug. 2, 2012

(30) Foreign Application Priority Data

Jan. 27, 2011   (JP) .................................. 2011-015705

(51) Int. Cl.
*G06F 3/033* (2013.01)
*H04N 13/02* (2006.01)
*H04N 13/04* (2006.01)
*G06T 11/00* (2006.01)

(52) U.S. Cl.
CPC .......... *G06T 11/001* (2013.01); *H04N 13/0278* (2013.01); *H04N 13/0468* (2013.01)
USPC ................ 345/158; 345/7; 345/633; 345/157

(58) Field of Classification Search
CPC ......... G06F 3/048; G06F 3/0325; H04N 1/00; H04N 2209/043; H04N 5/2256; G09G 5/006; G06T 5/001; G06T 15/50; G06T 13/20; G06T 15/00; G06T 5/00; G09B 9/302
USPC ............. 345/7, 158, 419, 426, 427, 589, 633, 345/157, 165; 382/167; 351/206
See application file for complete search history.

(56) References Cited

U.S. PATENT DOCUMENTS

| | | | | |
|---|---|---|---|---|
| 5,577,175 A * | 11/1996 | Naka et al. | ..................... | 345/427 |
| 6,018,350 A * | 1/2000 | Lee et al. | ...................... | 345/426 |
| 6,064,749 A * | 5/2000 | Hirota et al. | .................. | 382/103 |
| 6,151,028 A * | 11/2000 | Kumagai et al. | ............... | 345/427 |
| 6,798,390 B1 * | 9/2004 | Sudo et al. | ......................... | 345/7 |
| 6,930,685 B1 * | 8/2005 | Sakagawa et al. | ............ | 345/426 |
| 7,965,304 B2 * | 6/2011 | Sakagawa et al. | ............ | 345/633 |
| 2003/0052893 A1 * | 3/2003 | Sawada | ......................... | 345/589 |
| 2004/0169648 A1 * | 9/2004 | Sawada | ......................... | 345/419 |
| 2005/0190181 A1 * | 9/2005 | Sakagawa et al. | ............ | 345/419 |
| 2011/0026824 A1 * | 2/2011 | Ishii | .............................. | 382/167 |
| 2011/0242486 A1 * | 10/2011 | Ebisawa | ....................... | 351/206 |
| 2013/0195357 A1 * | 8/2013 | Ishii | .............................. | 382/167 |

FOREIGN PATENT DOCUMENTS

| | | |
|---|---|---|
| JP | 2003-099801 A | 4/2003 |
| JP | 2006-106950 A | 4/2006 |
| JP | 2007-233701 A | 9/2007 |

* cited by examiner

*Primary Examiner* — Thuy Pardo
(74) *Attorney, Agent, or Firm* — Carter, DeLuca, Farrell & Schmidt, LLP

(57) ABSTRACT

There is provided an image processing apparatus comprising: an input unit configured to input object data including reflection characteristics of an object; an acquisition unit configured to acquire observation position data indicating the observation position of an observer and light source data indicating a surrounding light source around the image capture unit, on the basis of image data captured by the image capture unit; and a generation unit configured to generate image data, which image includes the object placed on the display unit, on the basis of the object data, the observation position data, and the light source data, wherein the image data indicate the image which is observed at the observation position when light from the light source is reflected by the object.

10 Claims, 10 Drawing Sheets

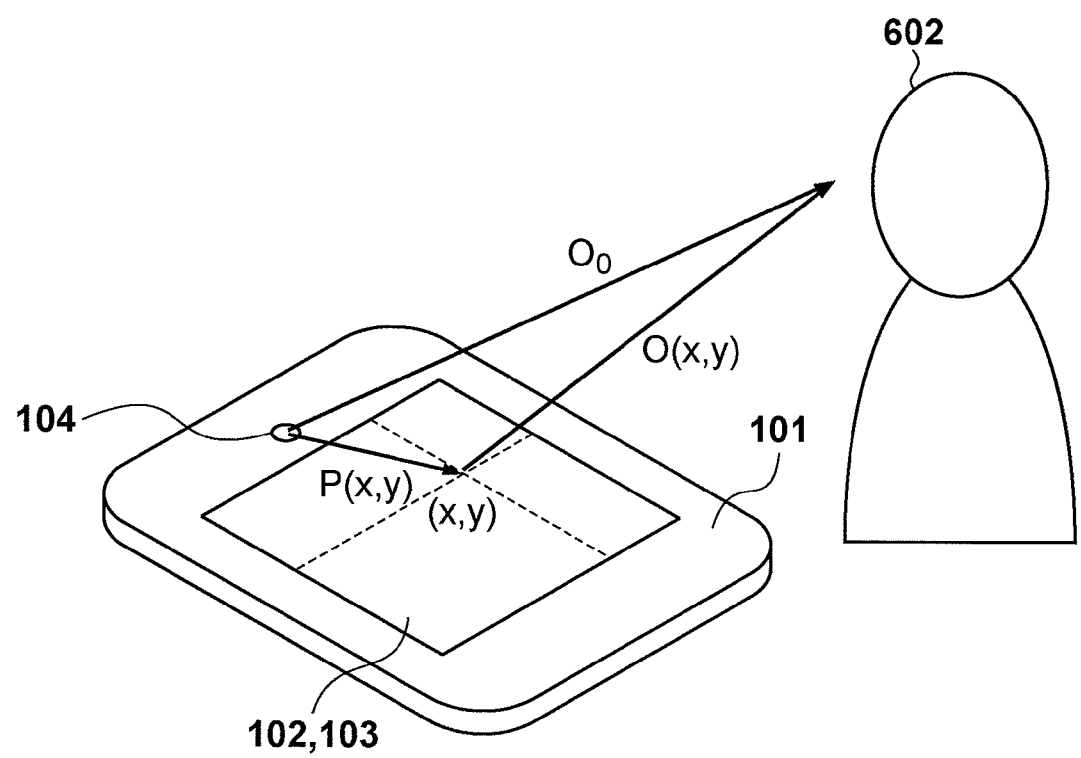
F I G. 11

IMAGE PROCESSING APPARATUS, IMAGE PROCESSING METHOD, AND STORAGE MEDIUM

BACKGROUND OF THE INVENTION

1. Field of the Invention

The present invention relates to an image processing technique for altering a display in accordance with a surrounding environment.

2. Description of the Related Art

The perceived color of a real object changes with the observation direction and the light source direction. One reason for this is that the gloss component changes with the observation direction and the light source direction. Specific examples of the gloss component include a light source image reflected on a real object, and a surrounding environment image reflected on a real object. It is also known that an interference color of light produced by a thin film, or coloration attributable to a microstructure such as the wings of a Morpho butterfly (hereinafter referred to as structural color) also cause the perceived color to vary with the observation direction and the light source direction.

In generating an image of a virtual space, there is a known method for reproducing gloss according to a light source placed inside the virtual space and a viewpoint placed inside the virtual space. One example is a method in which light ray tracking or photon mapping is used to calculate the amount of light that reaches a viewpoint. Environment mapping is also known as a way to reproduce the reflection of the surrounding environment. In environment mapping, a viewpoint and a surrounding environment texture image are placed inside a virtual space, and the viewpoint and the angle of virtual object surfaces are used to reproduce the reflection of the surrounding environment in the virtual object. For example, with a technique disclosed in Japanese Patent Laid-Open No. 2003-99801, glare and reflection of the surrounding landscape on a real object are reproduced according to previously produced surrounding landscape data and data about the light source placed according to user instructions.

As discussed above, the perceived color of a real object changes with the observation direction and the light source direction. However, there was no known method for reproducing on a display apparatus such a change in the color of a real object that depends on the observation direction and the light source direction. For example, the method disclosed in Japanese Patent Laid-Open No. 2003-99801 is a method for generating a virtual space image according to a viewpoint and a light source placed at specified positions within a virtual space, but cannot reproduce the change in the color of a real object that depends on the observation direction and the light source direction in a real space.

SUMMARY OF THE INVENTION

The present invention provides a technique for reproducing on a display apparatus the change in the color of a real object that depends on the observation direction and the light source direction.

According to one aspect of the invention, an image processing apparatus that performs processing for an image display apparatus having a display unit and an image capture unit, comprises: an input unit configured to input object data including reflection characteristics of an object; an acquisition unit configured to acquire observation position data indicating the observation position of an observer and light source data indicating a surrounding light source around the image capture unit, on the basis of image data captured by the image capture unit; and a generation unit configured to generate image data, which image includes the object placed on the display unit, on the basis of the object data, the observation position data, and the light source data, wherein the image data indicate the image which is observed at the observation position when light from the light source is reflected by the object.

According to another aspect of the invention, an image processing method for an image display apparatus having a display unit and an image capture unit, comprises the steps of: inputting object data including reflection characteristics of an object; acquiring observation position data indicating the observation position of an observer and light source data indicating a surrounding light source around the image capture unit, on the basis of image data captured by the image capture unit; and generating image data, which image includes the object placed on the display unit, on the basis of the object data, the observation position data, and the light source data, wherein the image data indicate the image which is observed at the observation position when light from the light source is reflected by the object.

According to the invention, the change in the color of a real object that depends on the observation direction and the light source direction can be reproduced on a display apparatus.

Further features of the present invention will become apparent from the following description of exemplary embodiments (with reference to the attached drawings).

BRIEF DESCRIPTION OF THE DRAWINGS

FIG. 11 is a diagram of the relation between the position vector and the emergent light vector in Example 1.

DESCRIPTION OF THE EMBODIMENTS

Embodiments of the present invention will now be described in detail through reference to the drawings. The following embodiments are not intended to limit the scope of the claims of the present invention, and not all the combinations of features described in the following embodiments are necessarily essential to the constitution of the present invention.

Example 1

Example 1, which is an example according to the present invention, will now be described in detail through reference to the drawings. In this example, color changes attributable to the above-mentioned gloss component, interference color, structural color, and so forth are reproduced on a display apparatus (hereinafter referred to as gonio-spectral color reproduction).

Figure 1:
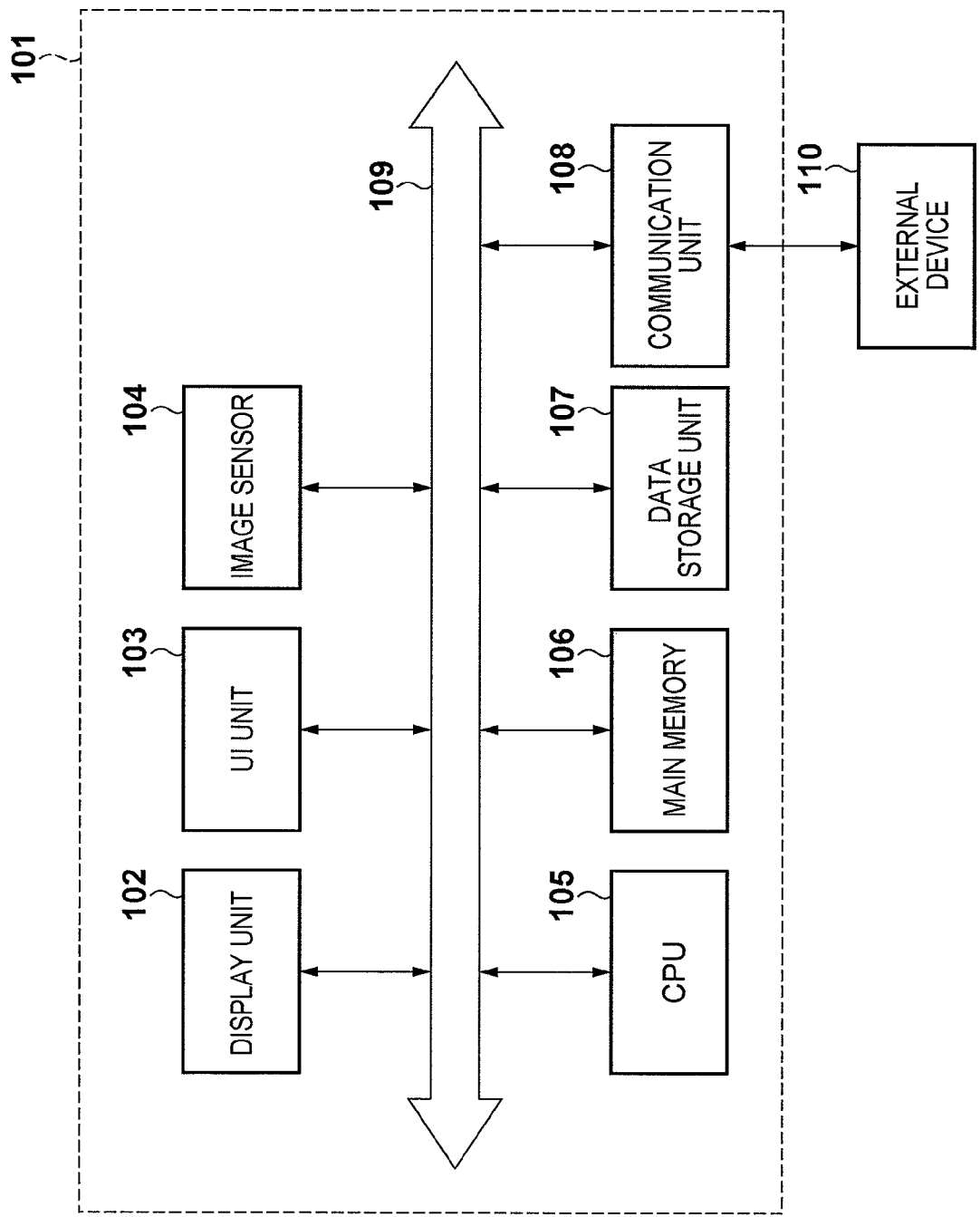
FIG. 1 is a block diagram of the configuration of an image display apparatus in Example 1.

First, an example of the configuration of an image display apparatus 101 in this example will be described through reference to FIGS. 1 and 2. FIG. 1 is a block diagram of the configuration of the image display apparatus 101 according to the present invention. 102 to 109 are constituent elements of the image display apparatus 101. 102 is a display unit, 103 is a user interface unit, and 104 is an image sensor. 105 is a CPU, 106 is a main memory, 107 is a data storage unit such as a hard disk drive, a solid state drive, or the like, 108 is a communication unit that can be connected to an external device, a network, or the like, such as a USB, Wi-Fi, or the like, and 109 is a main bus 109. 110 is any of various kinds of external device connected via the communication unit 108.

The image processing in this example is accomplished with an image processing application that runs on the image display apparatus 101. This image processing application can also run on a general purpose operating system that runs on the image display apparatus 101. More specifically, the image processing application and the general purpose operating system are stored in the data storage unit 107 or other such storage unit, are expanded in the main memory 106 under the control of the CPU 105, and are executed by the CPU 105. The CPU 105 controls the various units of the image display apparatus 101 according to the image processing application and the general purpose operating system. The general purpose operating system and the image processing application here can be realized using computer programs that can be achieved with known technology. Thus, the detailed operation of the image processing application in the general purpose operating system will not be described here.

An example of the operation of the image display apparatus 101 in this example will now be briefly described. First, the image processing application stored in the data storage unit 107 is activated by a command from the CPU 105, and expanded in the main memory 106. Also, the CPU 105 displays a screen on the display unit 102 according the image processing application. Then, object data stored in the data storage unit 107 or an external device 110 is transferred through the bus 109 to the main memory 106 according to the image processing application.

After this, image data acquired by the image sensor 104 is transferred to the main memory 106 as needed through the bus 109 according to the image processing application. Further, the CPU 105 produces display image data on the basis of the image data and object data in the main memory 106 according to the image processing application. The display image data thus produced is displayed on the display unit 102 via the bus 109.

Figure 2:
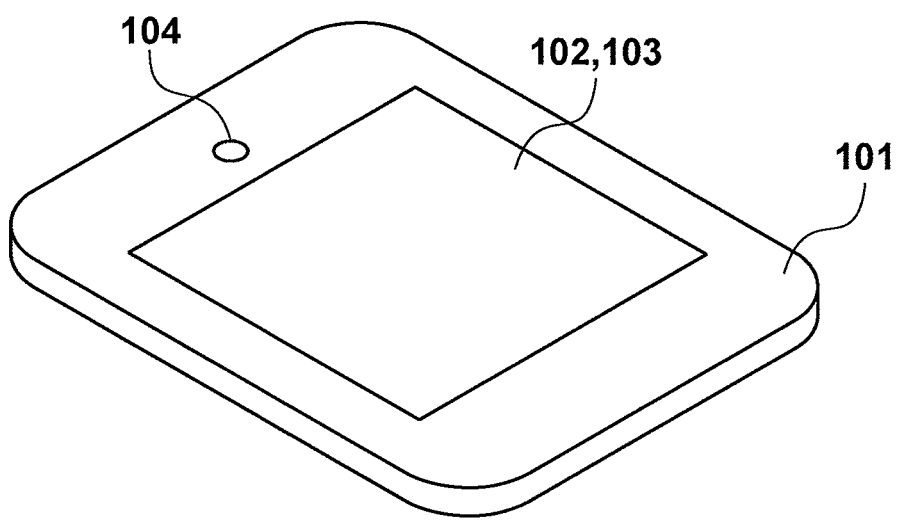
FIG. 2 is a diagram of the appearance of an image display apparatus in Example 1.

FIG. 2 is a diagram of the appearance of the image display apparatus 101. The image display apparatus 101 comprises the display unit 102, the user interface unit 103, and the image sensor 104, on its outer face. The image display apparatus 101 is portable, allowing the user to move around while holding it, and can also be tilted. That is, the user can put the image display apparatus 101 in various environments.

In this example, the display unit 102 and the user interface unit 103 are joined as a color liquid crystal display equipped with a touch panel function. More precisely, the user interface unit 103, which is a touch panel, is laminated over the display unit 102, which is a liquid crystal display. In this example, the display unit 102 is able to reproduce a known sRGB color space.

In this example, color reproduction of an object is performed in the image displayed on the display unit 102. Accordingly, if the display unit 102 itself is glossy, there is the possibility that a reflection of the surface of the display unit 102 will overlap a reflection reproduced on the image. This can hinder gonio-spectral color reproduction. Therefore, the surface of the display unit 102 can be subjected to treatment that limits the reflection of external light. In this example, since the touch panel is laminated over the liquid crystal display, the touch panel surface is given a non-glare treatment.

The image sensor 104 is a two-dimensional image sensor, and is placed next to the display unit 102 on the surface of the image display apparatus 101. The image sensor 104 captures the images in the display face side of the display unit 102. The image display apparatus 101 uses the captured image to estimate and acquire the incident light situation and the position of the observer. We will assume that the image display apparatus 101 in this example has a color digital image sensor capable of acquiring the luminance of each RGB color in real time.

Figure 3:
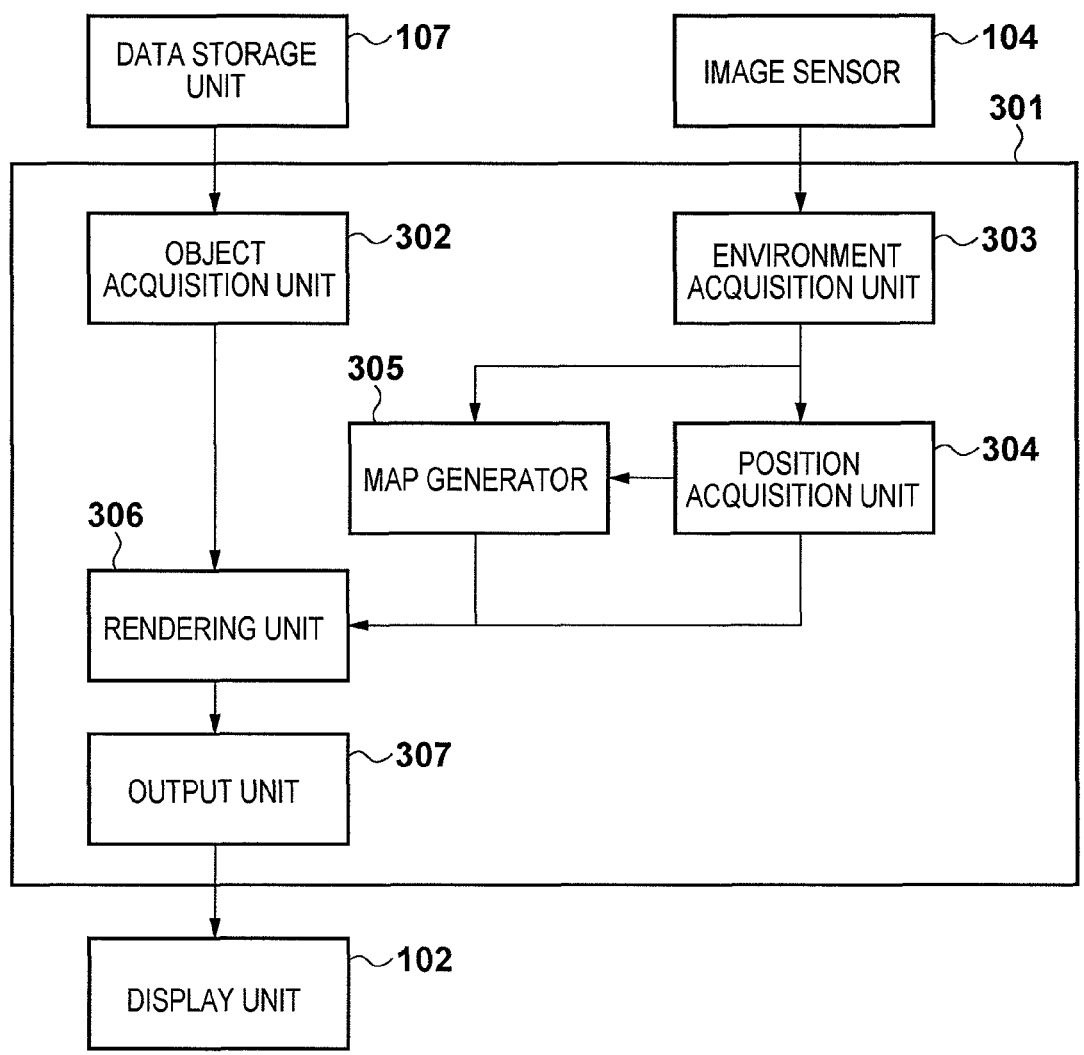
FIG. 3 is a block diagram of the theoretical configuration of an image processing application in Example 1.

The image processing application according to this example will be described. FIG. 3 is a block diagram of the theoretical configuration of an image processing application for realizing the present invention. 301 is an image processing application that runs on the image display apparatus 101, and includes 302 to 307. 302 is an object acquisition unit that acquires object data (input data) stored in the external device 110 or the data storage unit 107. 303 is an environment acquisition unit that drives the image sensor 104 and acquires an image of the display face side of the display unit 102 (environment image).

304 is a position acquisition unit that uses an environment image to estimate the direction and distance of an observer. 305 is a map generator that uses an environment image to generate an incident light map. An incident light map is a type of environment map. The luminance value of light that is incident on an object is recorded for each direction in the incident light map. In this example, luminance value data is modeled as a flat or curved surface in the incident light map.

306 is a rendering unit that generates a gonio-spectral color reproduction image on the basis of object data, the position of the observer, and the incident light map. In a gonio-spectral color reproduction image, the color, gloss, and so forth of an object as seen by an observer are reproduced. 307 is an output unit that outputs images to the display unit 102 according to the gonio-spectral color reproduction image.

Object Data

In this example, object data indicates the following association information for the RGB color of each pixel. A first direction going from the image display apparatus 101 toward a light source that is outside of the image display apparatus 101, a second direction going from the image display apparatus 101 toward an observer of the image display apparatus 101, the illuminance value of light shined from a light source at a display apparatus, and the luminance value are associated with one another. More specifically, in this example, planar image data indicating reflection characteristics corresponding to the first direction (direction of light incidence) and the second direction (direction of light emergence) for each pixel (hereinafter referred to as gonio-spectral reflection characteristics) is used to perform gonio-spectral color reproduction.

A BRDF (bidirectional reflectance dispersion function) can be used as a typical method for describing these gonio-spectral reflection characteristics. In this example, a gonio-spectral reflection model is used, which is a color reproduction model based on a BRDF. In a gonio-spectral reflection model, data recording the reflectance $Ref_R$, $Ref_G$, and $Ref_B$ for each RGB color is used for every combination of the incidence angle θin, the emergence angle θout, and the rotational angle φ. This data will be called gonio-spectral reflection data below.

Thus, in this example, the incidence angle θin, the emergence angle θout, and the rotational angle φ are used as parameters indicating the incidence direction and reflection direction of light. As will be described below, the incidence angle θin, the emergence angle θout, and the rotational angle φ can be found from the incidence direction and emergence direction of light. As discussed below, the reflectance Ref is the ratio of the luminance value to the illuminance value of light on a display apparatus, which light is shined from a light source. Thus, in this example, the reflectance Ref is used to indicate the relation between the intensity value of light at a display apparatus, which light is shined from a light source, and the luminance value. In this example, a table is prepared that holds combinations of θin, θout, φ, $Ref_R$, $Ref_G$, and $Ref_B$ as object data, that is, a gonio-spectral reflection data for each pixel of an object.

The incidence angle θin is the angle formed by the incident light vector and the normal vector of a reflection surface (object). The emergence angle θout is the angle formed by the emergent light vector and the normal vector of a reflection surface. The rotational angle φ is the angle formed by vectors that are obtained when the incident light vector and the emergent light vector are projected onto a reflection surface. The reflectance Ref is a value indicating the ratio between the illuminance value of light shined from the direction of the incident light vector and the luminance value of an object surface observed from the direction of the emergent light vector when there is no other light source. The reflectance is given in units of 1/sr. The range of the various parameters is $0°<θin<90°$, $0°<θout<90°$, and $0°<φ<180°$. In this example, the reflectance $Ref_R$, $Ref_G$, and $Ref_B$ are recorded in five-degree increments for θin, θout, and φ as gonio-spectral reflection data.

Coordinate System

Figure 4:
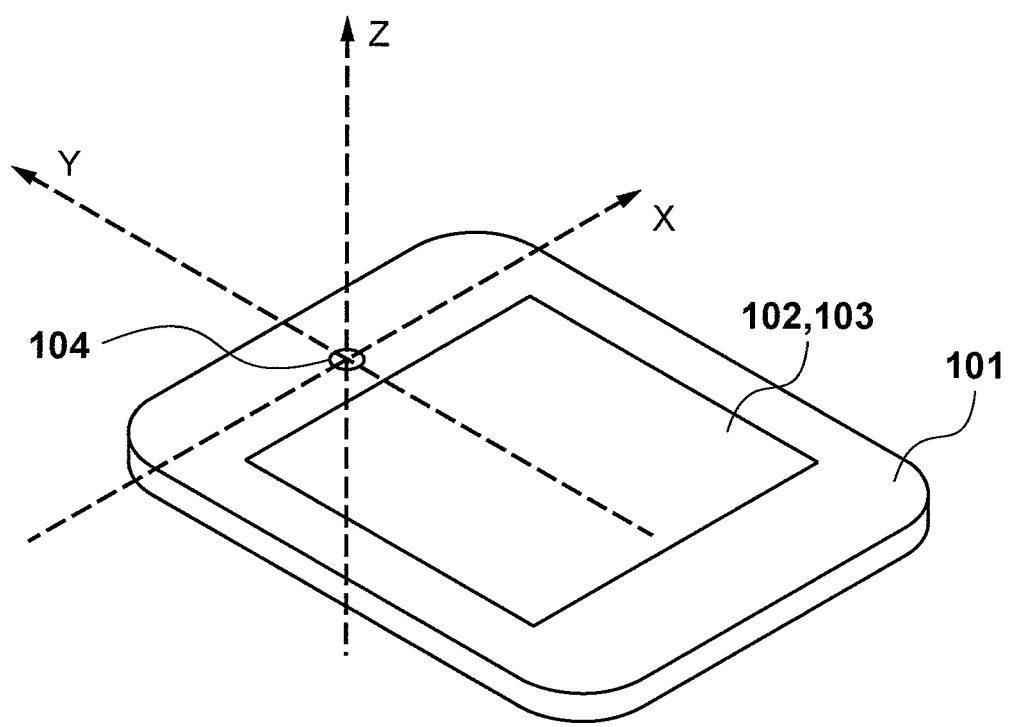
FIG. 4 is a diagram of an XYZ perpendicular coordinate system used in image processing in Example 1.

FIG. 4 is a diagram of the orientation of the XYZ axes used for description in this example. In this example, the position of the image sensor 104 is used as an origin, and the optical axis of the image sensor 104 (a direction perpendicular to the surface of the image display apparatus 101) is used as the Z axis. The direction in which the image sensor 104 is facing is used as the Z axis positive direction. A line connecting the centers of the image sensor 104 and the display unit 102 is used as the Y axis, and the image sensor side is used as the Y axis positive direction. An axis perpendicular to the Z axis and the Y axis is used as the X axis, and the direction that goes clockwise as seen from the Y axis positive direction is used as the X axis positive direction. The display unit 102 is located in the XY plane in which Z=0.

Overall Processing

Figure 5:
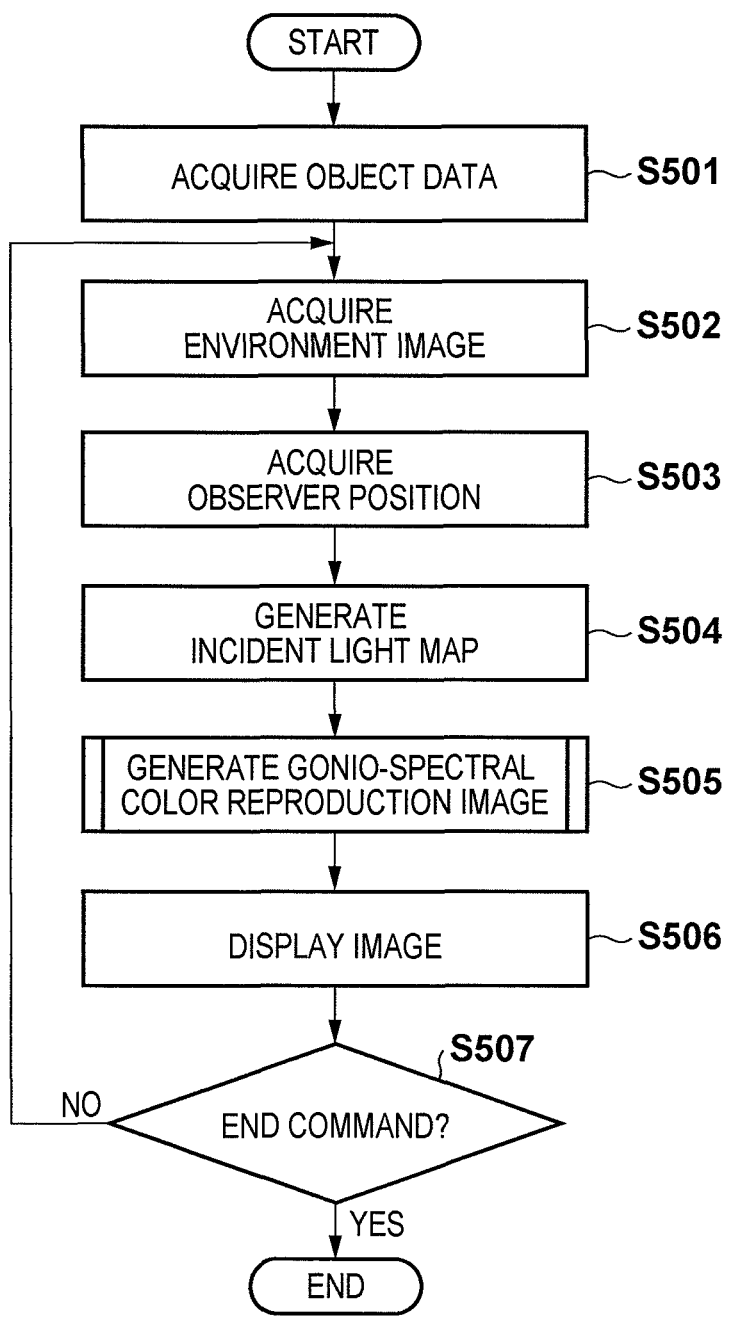
FIG. 5 is a flowchart of the flow of image processing in Example 1.

Next, the image processing performed by the image processing application 301 will be described. FIG. 5 is a flowchart of the flow of image processing in this example. The steps that can be executed in parallel may be executed in parallel, or may be executed in the reverse order.

In step S501 the object acquisition unit 302 acquires object data. For instance, the object acquisition unit 302 acquires object data stored in the data storage unit 107 or the external device 110. The object acquisition unit 302 then expands the acquired object data in the main memory 106. The image processing application 301 is thus able to access object data.

The subsequent processing in steps S502 to S507 is repeatedly executed at a rate according to the computational capability of the image processing application 301, or the refresh rate of the display unit 102. Repeating a series of processing at a suitable rate allows the display to reflect changes in the environment around the image display apparatus 101, changes in the position of the observer, and changes in the orientation of the image display apparatus 101.

Figure 6:
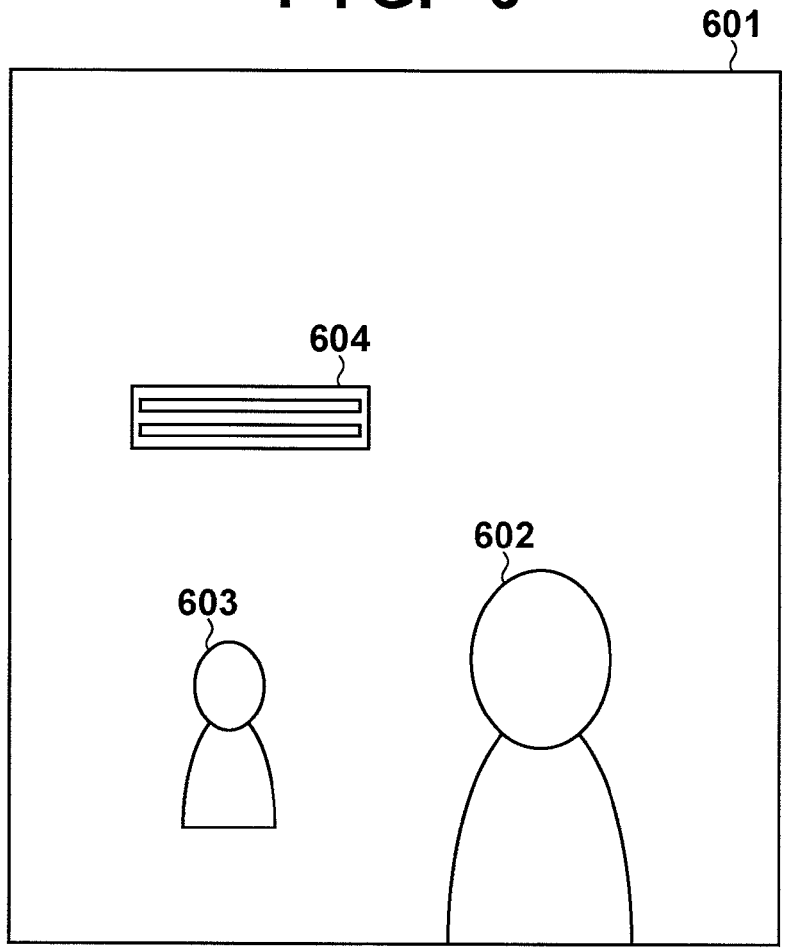
FIG. 6 is a diagram of an example of an environment image in Example 1.

In step S502 the environment acquisition unit 303 drives the image sensor 104 and acquires an image (environment image). The environment acquisition unit 303 then stores the acquired image in the main memory 106. FIG. 6 shows an example of an acquired environment image. 601 is a captured environment image, and a primary observer 602, a secondary observer 603, and a light source 604 appear in this environment image 601.

Figure 7:
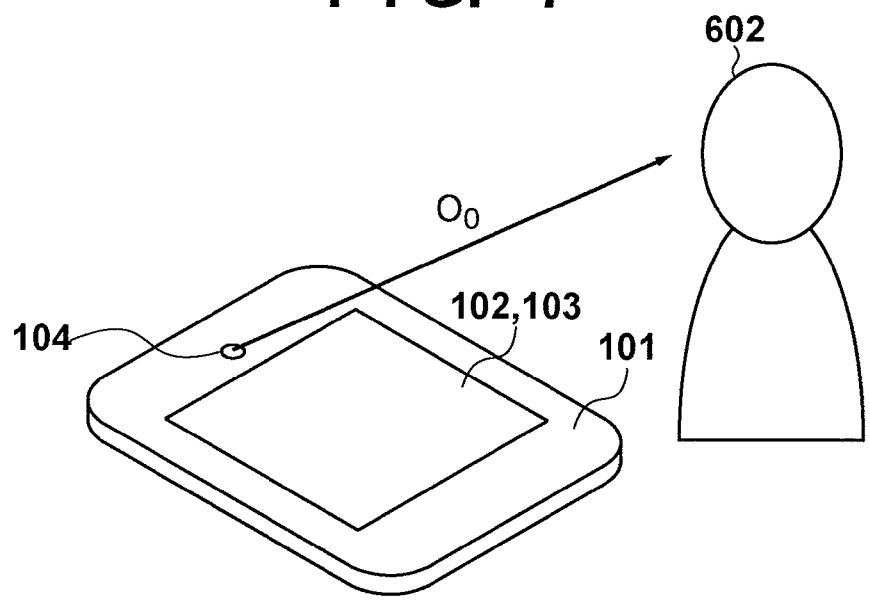
FIG. 7 is a diagram of a position vector in Example 1.

In step S503, the position acquisition unit 304 uses the environment image 601 to calculate a position vector $O_0$ (second estimation). The position vector $O_0$ is a vector (second direction) going from the image sensor 104 toward the primary observer 602. FIG. 7 shows the relation between the image sensor 104, the primary observer 602, and the position vector $O_0$. The starting point of the position vector $O_0$ is the image sensor 104, and the end point is the primary observer 602. In this example, the end point of the position vector $O_0$ is the viewpoint of the primary observer 602. More specifically, the end point of the position vector $O_0$ is the middle point between the eyes of the primary observer 602. The end point of the position vector $O_0$ is not limited to this, of course.

To calculate the position vector $O_0$, the position acquisition unit 304 uses a known facial detection algorithm to detect any faces present in the environment image 601. The position acquisition unit 304 also acquires the distance from the image sensor 104 for each of the detected faces. In this example, a known contrast detection method is used to detect the distance between a face and the image sensor 104.

Two faces, of the primary observer 602 and the secondary observer 603, are detected from the environment image 601. In this example the position acquisition unit 304 selects as a representative observer the primary observer 602 that is closest to the image sensor 104. The distance between the image sensor 104 and the primary observer 602 is the magnitude of the position vector $O_0$. The position acquisition unit 304 further determines the direction of the position vector $O_0$ according to the field angle of the image sensor 104 and the position of the face of the primary observer 602 in the environment image 601.

If no observer is detected in the environment image 601, the position vector $O_0$ can be set as desired. For example, it may be that a face cannot be detected because the observer is facing the other way or for another reason, or it may be that the observer is outside the field angle of the image sensor 104. In a case such as these, the position acquisition unit 304 may acquire a previously calculated position vector $O_0$, such as a position vector $O_0$ calculated immediately before. Also, the position acquisition unit 304 may use as the position vector $O_0$ a vector indicating the position of the front of the display unit 102, or may use as the position vector $O_0$ a vector indicating a point on the outer edge of the display unit 102.

Figure 8:
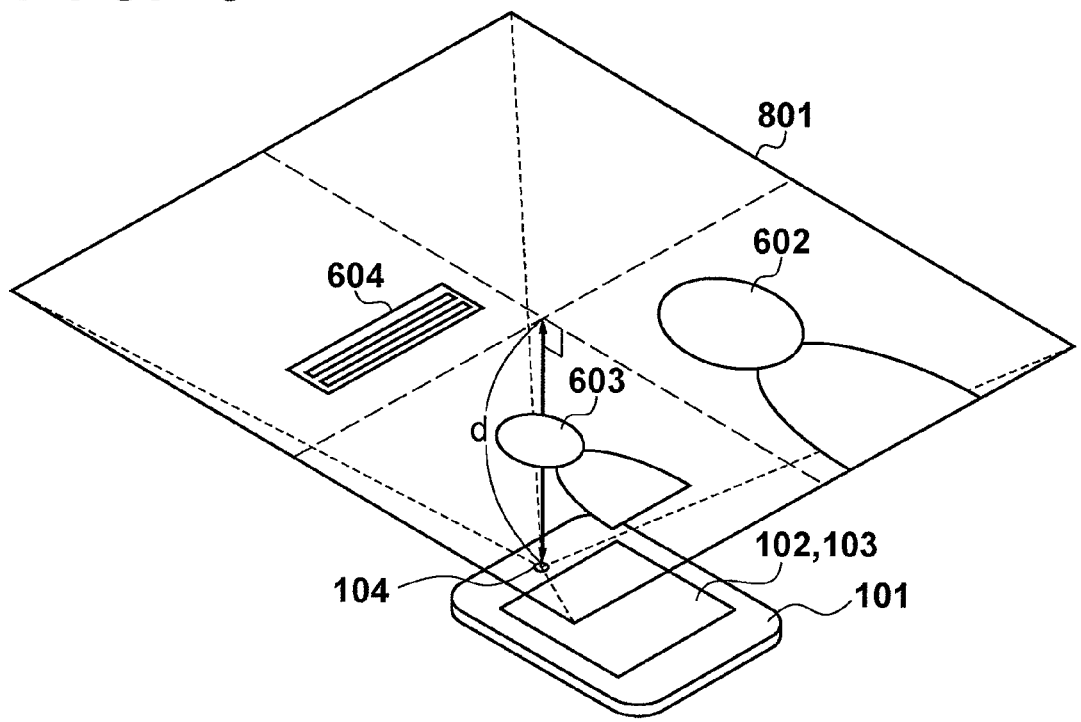
FIG. 8 is a diagram of the shape and layout of a captured incident light map in Example 1.

In step S504, the map generator 305 uses the environment image acquired in step S502 to generate an incident light map. First, the map generator 305 produces a captured incident light map by using the environment image. FIG. 8 is a diagram of the shape of a captured incident light map 801 in this example. FIG. 8 also shows the positional relation between the image display apparatus 101 and the captured incident light map 801 in this example.

The captured incident light map 801 is a partial plane, and lies in a plane perpendicular to the optical axis of the image sensor 104. The distance between the image sensor 104 and the captured incident light map 801 is indicated by d. The distance d in this example is an arbitrary value that is set ahead of time. For example, the distance d may be infinitely large. Also, in this example the size of the captured incident light map 801 coincides with the image capture range of the image sensor 104. The pixel count of the captured incident light map 801 is equal to the pixel count of the environment image 601. Also, the luminance of each pixel is the same as the luminance of the environment image 601. That is, the captured incident light map 801 is equivalent to placing the environment image 601 in a plane that is the distance d away from the image sensor (origin).

In step S504, the map generator 305 may remove the face of an observer from the captured incident light map 801 according to a command from the user. The position acquisition unit 304 in this example detects the face of an observer from an environment image in order to calculate the position vector $O_0$. Also, the map generator 305 generates a captured incident light map by using the same environment image. Therefore, it is very likely that the face of an observer is included in the captured incident light map 801.

If the face of an observer is included in the captured incident light map 801, as will be described below, a display is performed on the display unit 102 so that the observer's face appears on an object. However, if the actual distance from the image sensor 104 to the observer is considerably different from the distance from the image sensor (origin) in the captured incident light map 801 to the observer, then there is the possibility that the position, size, shape, and so forth of the reflected observer will look unnatural. An unnatural display such as this can be avoided by removing the face of the observer from the captured incident light map 801.

In this example, an instruction to remove an observer's face from the captured incident light map 801 is received from the user. The map generator 305 in this case extracts the light source portion from the captured incident light map 801. For example, the map generator 305 can set luminance information other than that of the light source portion to a constant value in the captured incident light map 801. A specific luminance threshold can be used for this purpose. This luminance threshold may be set ahead of time, or may be inputted by the user. Also, this luminance threshold may be found according to the luminance distribution of the captured incident light map 801. For example, this luminance threshold may be a statistical value, such as the average of the luminance values in the captured incident light map 801, or a specific percentile value.

The map generator 305 replaces the luminance value with a fixed value for each pixel having a luminance under the threshold in the captured incident light map 801. Any desired value can be used as this fixed value. For example, this fixed value can be a statistical value such as the average of luminance values for pixels having a luminance under the threshold. Also, this fixed value may be inputted by the user, or may be a predetermined value.

In step S504, the map generator 305 may produce an expanded incident light map 901 from the captured incident light map 801. The effect of incident light from outside the field angle of the image sensor 104 can be reproduced by producing the expanded incident light map 901 (discussed below). In this example, the map generator 305 produces an expanded incident light map 901 from the captured incident light map 801, and the expanded incident light map 901 is used in subsequent processing. However, the map generator 305 does not need to generate an expanded incident light map 901, and the captured incident light map 801 may be used in subsequent processing instead.

Figure 9:
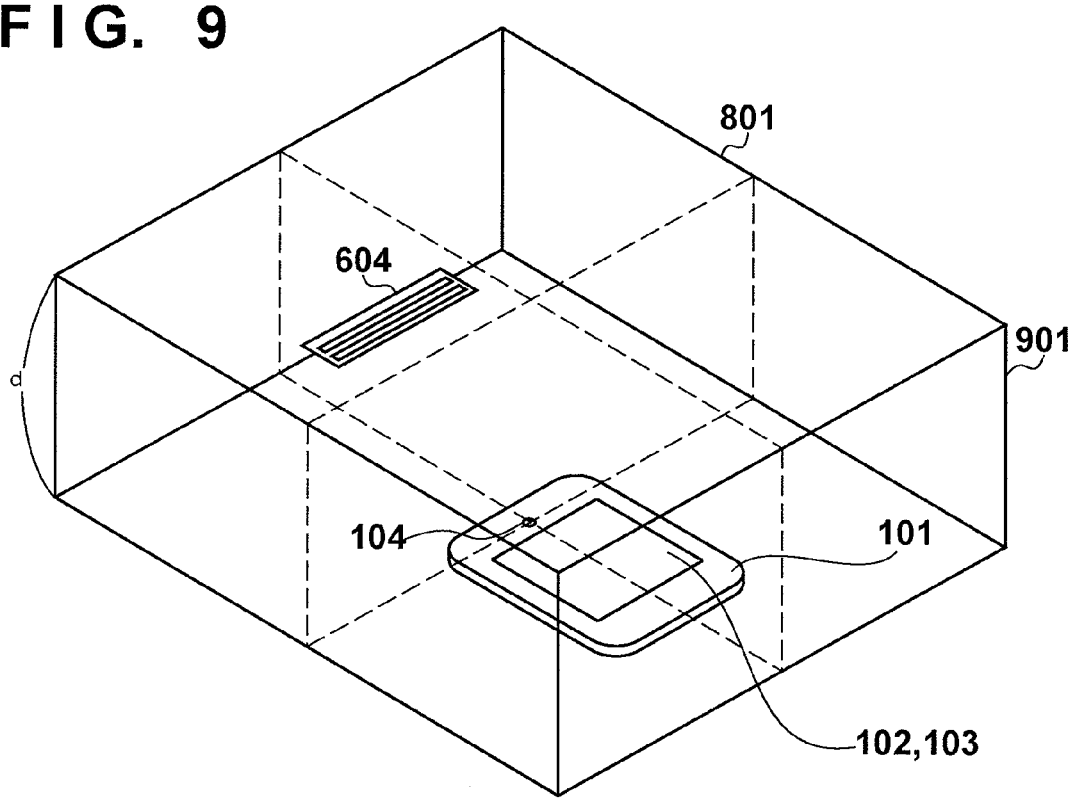
FIG. 9 is a diagram of the shape and layout of a expanded incident light map in Example 1.

FIG. 9 is a diagram of the positional relation between the image display apparatus 101 and the shape of the expanded incident light map 901 in this example. The expanded incident light map 901 according to this example is a cube map. More specifically, one of the bottom faces of the cube map (hereinafter referred to as the lower bottom face) is located in a plane in which Z=0, and the other bottom face of the cube map (hereinafter referred to as the upper bottom face) is located in a plane in which Z=d. The captured incident light map 801 which includes the extracted light source portion is located in the plane in which Z=d. The positional relation between the image sensor 104 (origin) and the captured incident light map 801 is the same as discussed above, and therefore will not be described again.

The luminance of all pixels on the side face of the expanded incident light map 901 is set to a specific value. For example, this specific value can be the constant value which is used for the luminance value other than the light source portion in the captured incident light map 801. The luminance value of the side face of the expanded incident light map 901 is of course not limited to this, and the larger is the Z coordinate, the greater may be the luminance value, for example. Also, the side face of the expanded incident light map 901 is assumed to have the same resolution as the captured incident light map 801. Furthermore, in this example we will assume that no luminance has been set for the lower bottom face of the expanded incident light map 901.

In the above description, the environment image 601 acquired in step S502 is used in both step S503 and step S504. However, the image used in step S503 and the image used in step S504 may be different images. For example, the environment acquisition unit 303 in step S502 may vary the image capture conditions, such as the exposure and depth of field, and separately acquire the image for use in step S503 and the image for use in step S504.

In step S505 the rendering unit 306 generates a gonio-spectral color reproduction image on the basis of object data, an observer vector, and an incident light map. The details of step S505 will be discussed below.

In step S506 the output unit 307 performs image display on the display unit 102 according to the gonio-spectral color reproduction image generated in step S505. The output unit 307 here may perform image processing on the gonio-spectral color reproduction image. For example, even though the display unit 102 displays the same image, the image perceived by the observer might be different depending on the position of the observer. These gonio-spectral characteristics of the display unit 102 can be taken into account to perform color correction on the gonio-spectral color reproduction image so that the gonio-spectral color reproduction image calculated in step S505 will be perceived correctly by the observer.

More specifically, the output unit 307 can store an observer vector and a correction coefficient for each color component, for each of the pixels of the display unit 102. The output unit 307 can generate image data to be output to the display unit 102 from the luminance value of the gonio-spectral color reproduction image and a correction coefficient for the observer vector. For instance, a value obtained by multiplying the luminance value of the gonio-spectral color reproduction image by the correction coefficient may be used as the luminance value of image data to be output to the display unit 102.

Also, there is the possibility that the gonio-spectral color reproduction image generated in step S505 will have a color gamut exceeding the sRGB, which is the color gamut that can be reproduced by the display unit 102 according to this example. The output unit 307 may correct the color of the image according to known color gamut compression technology or HDR technology. Also, the output unit 307 may generate display data such as GUI, which are needed for the operation of applications. Such data can be added to or superposed over the gonio-spectral color reproduction image.

In step S507, an end determination unit (not shown) inside the image processing application 301 determines whether or not to end the processing in FIG. 5. For example, if the user gives an end command during the processing between steps S502 and S506, the end determination unit may determine to end the processing. Also, the end determination unit may determine whether or not to end processing on the basis of information acquired by the object acquisition unit 302, the environment acquisition unit 303, and the position acquisition unit 304. If the end determination unit determines to end processing, the processing in FIG. 5 is ended. If the end determination unit determines to continue processing, the processing returns to step S502.

Gonio-Spectral Color Reproduction Image Generation Processing

Figure 10:
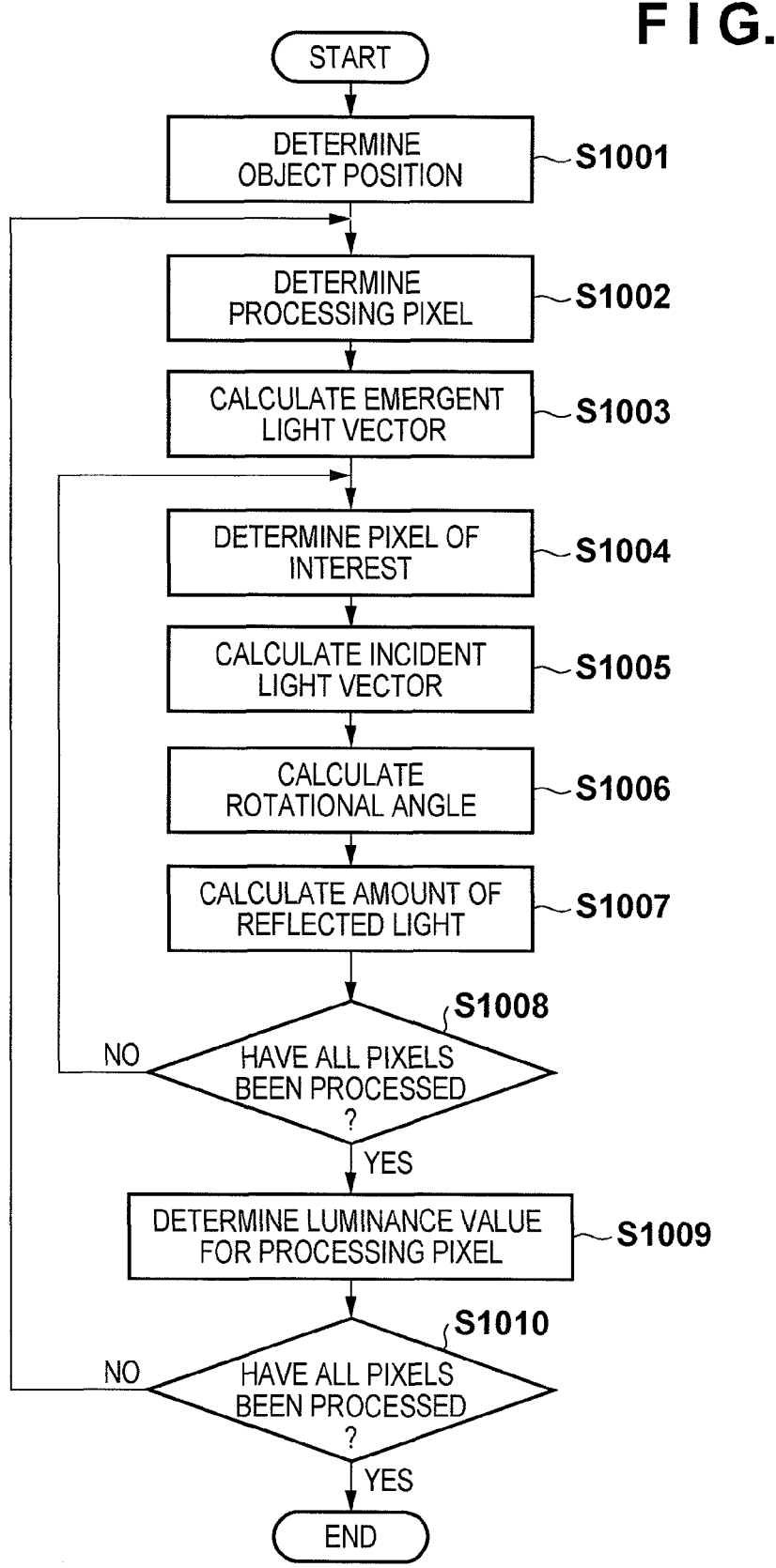
FIG. 10 is a flowchart of the flow of gonio-spectral color reproduction image generation processing in Example 1.

FIG. 10 is a flowchart of the details involved in processing to generate a gonio-spectral color reproduction image in step S505. In step S1001 the rendering unit 306 determines the position of an object, and the object is placed within a virtual space. In this example the virtual space shares its coordinate system with the above-mentioned real space. Specifically, the XYZ axes of the virtual space coincide with the XYZ axes of the real space having the above-mentioned image sensor 104 as its origin.

A planar object used in this example is placed on the XY plane within the virtual space, that is, at a position on the surface of the display unit 102. Furthermore, the rendering unit 306 can manipulate objects according to instructions from the image processing application 301 or the user. For example, the rendering unit 306 can rotate the objects around the Z axis, enlarge or reduce the size, or move the objects in parallel. The rendering unit 306 thus determines the positional relation between the objects and the display unit 102.

The rendering unit 306 then executes the processing from step S1002 to step S1010 for all the pixels of the display unit 102. First, in step S1002 the rendering unit 306 designates one pixel of the display unit 102 as a processing pixel. The designation in step S1002 can be carried out in any order desired, such as in raster order.

In step S1003 the rendering unit 306 calculates an emergent light vector $O_{(x,y)}$ indicating the positional relation between a pixel and the primary observer 602 for the processing pixel. FIG. 11 is a diagram of the positional relation between the image sensor 104, the processing pixel (x, y), and the primary observer 602. If we let $P_{(x,y)}$ be the coordinate vector of the processing pixel (x, y) (the vector from the origin to the processing pixel (x, y)), then the emergent light vector $O_{(x,y)}$ can be calculated from the following formula (1).

$$O_{(x,y)} = O_0 - P_{(x,y)} \quad (1)$$

Also, the rendering unit 306 finds the angle formed by the Z axis and the emergent light vector $O_{(x,y)}$, as the emergence angle $\theta out_{(x,y)}$ of light from the processing pixel (x, y).

The rendering unit 306 then executes the processing from steps S1004 to S1007 on all of the pixels of the expanded incident light map 901. First, in step S1004, the rendering unit 306 designates one of the pixels of the expanded incident light map 901 as a pixel of interest. In this example, all of the pixels on the upper bottom face and the side face of the expanded incident light map 901 are designated by the rendering unit 306 in step S1004. This is because the object displayed in this example is a plane located in the XY plane in which Z=0, and the incident light from the lower bottom face at which Z=0 does not affect how the object is seen. Of course, in another example the rendering unit 306 may designate pixels of the lower bottom face in step S1004.

Figure 12:
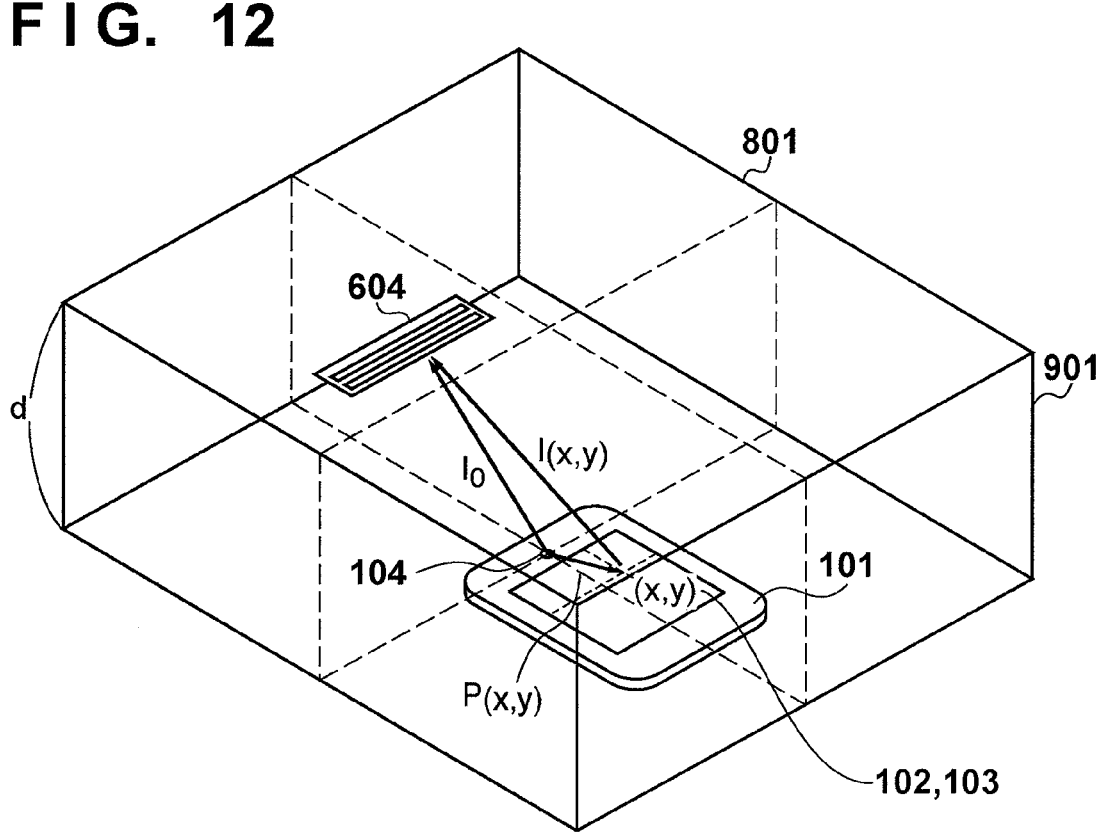
FIG. 12 is a diagram of the relation between the coordinate vector and the incident light vector in Example 1.

In step S1005, the rendering unit 306 calculates (first estimation) an incident light vector (first direction) $I_{(x,y)}$ indicating the positional relation between the pixel of interest and the processing pixel (x, y). The luminance value of the pixel of interest here indicates the intensity of light shined from a light source present in the direction of the incident light vector, at the processing pixel (x, y). FIG. 12 is a diagram of the positional relation between the image sensor 104 (origin), the processing pixel (x, y), and the expanded incident light map 901. If we let $I_0$ be the coordinate vector of the pixel of interest (the vector from the origin) and $P_{(x,y)}$ be the coordinate vector of the processing pixel (x, y), then the incident light vector $I_{(x,y)}$ can be calculated from the following formula (2).

$$I_{(x,y)} = I_0 - P_{(x,y)} \quad (2)$$

The rendering unit 306 finds the angle between the Z axis and the incident light vector $I_{(x,y)}$ as the incidence angle $\theta in_{(x,y)}$ of light into the processing pixel (x, y).

If the distance d between the image sensor 104 and the captured incident light map 801 is set to infinity, then an approximation of $I_{(x,y)} \approx I_0$ can be made for any pixel of interest and any processing pixel (x, y). Therefore, in this case $I_0$ may be used as the incident light vector $I_{(x,y)}$.

Figure 13:
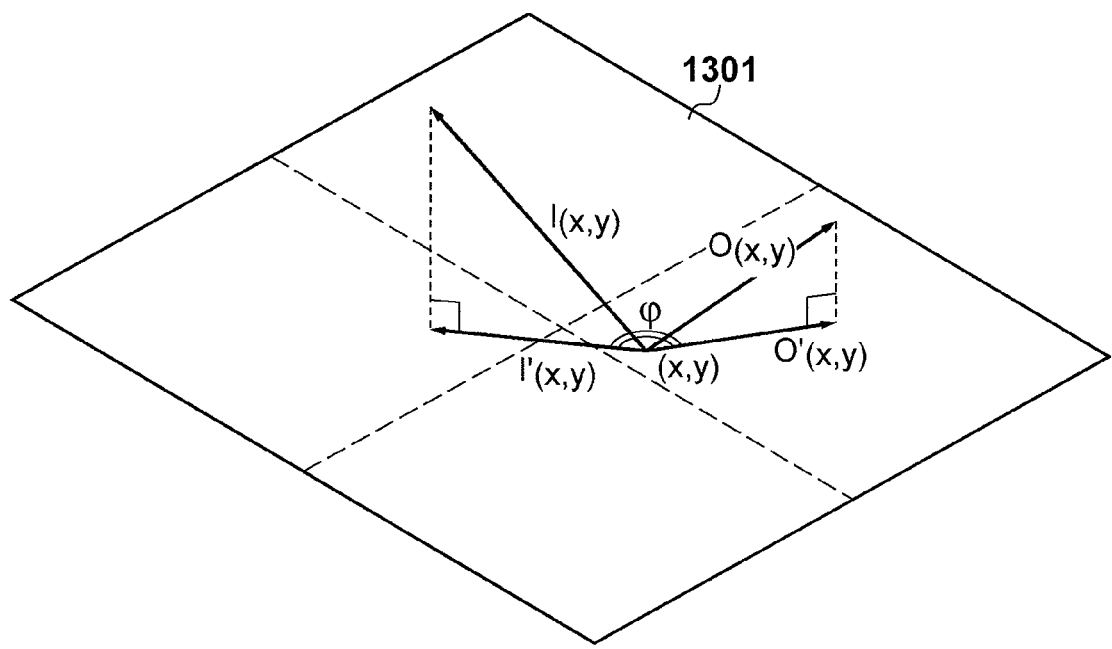
FIG. 13 is a diagram of the relation between the rotational angle and the incident light and emergent light vectors in Example 1.

In step S1006, the rendering unit 306 calculates the rotational angle $\phi$ between the incident light and the emergent light. FIG. 13 shows the relation between the incident light vector $I_{(x,y)}$, the emergent light vector $O_{(x,y)}$, and the rotational angle $\phi$. 1301 is the XY plane in which Z=0. The vector $I'_{(x,y)}$ is obtained by projecting the incident light vector $I_{(x,y)}$ onto the XY plane 1301. The vector $O'_{(x,y)}$ is obtained by projecting the emergent light vector $O_{(x,y)}$ onto the XY plane 1301. The angle between these vectors $I'_{(x,y)}$ and $O'_{(x,y)}$ is used as the rotational angle between the incident light vector $I_{(x,y)}$ and the emergent light vector $O_{(x,y)}$ in this example.

In step S1007, the rendering unit 306 calculates the amount of reflected light on the primary observer 602 with respect to the incidence of light from the pixel of interest, at the processing pixel (x, y). First, the rendering unit 306 acquires gonio-spectral reflection data about the object for the processing pixel. More specifically, the rendering unit 306 refers to the object data acquired by the object acquisition unit 302. The rendering unit 306 thus acquires the reflectance $Ref_R$, $Ref_G$, and $Ref_B$ corresponding to $\theta in_{(x,y)}$, $\theta out_{(x,y)}$, and $\phi$ for the pixel (x, y).

In this example, the reflectance with respect to a plurality of angle combinations is recorded in the gonio-spectral reflection data. Accordingly, the reflectance corresponding to combinations of $\theta in_{(x,y)}$, $\theta out_{(x,y)}$, and $\phi$ do not need to be included in the gonio-spectral reflection data. In this case, the reflectance may be found by Interpolation. For example, tetrahedral interpolation can be used.

After this, the rendering unit 306 calculates the luminance Rout, Gout, and Bout of light reflected from the processing pixel to the primary observer 602, corresponding to the light incident from the pixel of interest. The luminance Rout, Gout, and Bout of reflected light are calculated from the following formula (3).

$$\begin{pmatrix} R_{out} \\ G_{out} \\ B_{out} \end{pmatrix} = \begin{pmatrix} R_{in} Ref_R \\ G_{in} Ref_G \\ B_{in} Ref_B \end{pmatrix} \omega \qquad (3)$$

In Formula 3, Rin, Gin, and Bin are the luminance value of the pixel of interest in the expanded incident light map 901. In this example, the luminance value of the pixel of interest is used as the luminance of light incident from the pixel of interest. Also, ω is the solid angle of the pixel of interest as seen from the processing pixel, and the incident light illuminance is calculated by multiplying the solid angle ω with the incident light luminance. Therefore, as shown in Formula 3, the luminance Rout of reflected light for the R component, for example, is found as the product of luminance Rin of incident light, the reflectance Ref$_R$, and the incident light solid angle ω.

In step S1008, the rendering unit 306 determines whether or not the processing of steps S1004 to S1007 was performed for all of the pixels of the expanded incident light map 901. If processing is finished for all of the pixels, the processing proceeds to step S1009. If there are pixels that have not yet undergone processing, the processing returns to step S1004.

In step S1009, the rendering unit 306 totals the luminance Rout of reflected light found in step S1007 for each of the pixels of interest. The total value thus found becomes the luminance value of the R component for the processing pixel designated in step S1002 in a gonio-spectral color reproduction image. Similarly, the rendering unit 306 finds the total of the luminance Gout of reflected light for each of the pixels of interest, as the luminance value of the G component for the processing pixel. Also, the rendering unit 306 finds the total of the luminance Bout of reflected light for each of the pixels of interest, as the luminance value of the B component for the processing pixel.

In step S1010, the rendering unit 306 determines whether or not the processing of steps S1003 to S1009 was performed for all of the pixels of the display unit 102. If there are pixels that have not yet undergone processing, the processing returns to step S1002. If processing is finished for all of the pixels, the processing of step S505 ends. In this way, the rendering unit 306 calculates the luminance value of each of the pixels in a gonio-spectral color reproduction image.

As discussed above, with this example it is possible to perform gonio-spectral color reproduction in real time on the basis of the actual environment around the user.

Other Examples

Display Unit and User Interface Unit

In Example 1, a color liquid crystal display equipped with a touch panel function was used as the display unit 102 and the user interface unit 103, but the present invention does not require that the display unit 102 and the user interface unit 103 be integrated. Also, the display unit 102 and the user interface unit 103 can be embodied using different devices. For example, various kinds of button or a pointing device may be used as the user interface unit 103. Also, an external input device connected to the communication unit 108 may be used as the user interface unit 103.

An organic EL display or any of various other kinds of display device may be used as the display unit 102. Here, the display device used as the display unit 102 is assumed to have an adequate response speed. In this case, the display produced by the display unit 102 can reflect the surrounding environment in real time. Also, the color space used by the display unit 102 is not limited to sRGB. For instance, a known wide gamut RGB or other such color space may be used. Also, gonio-spectral color reproduction was performed for the three RGB colors in the above example, but the number of colors and the color combination are not limited to this. For example, the display unit 102 may be a monochrome display, in which case gonio-spectral color reproduction can be performed on a monochrome image.

Image Sensor

In Example 1, the image sensor 104 captured an image of the display face side of the display unit 102, but the optical axis of the image capture system of the image sensor 104 need not strictly be the normal direction of the display unit 102. Also, the image sensor 104 does not have to be fixed to the image display apparatus 101, and may be movable with respect to the image display apparatus 101, or may be separable from the image display apparatus 101.

In these cases, the positional/orientational relation between the image sensor 104 and the display unit 102 may be already known. A known positional/orientational relation can be taken into account in calculating the position vector O$_0$. Also, the image sensor 104 having a rectangular image capture region was used in Example 1, but the form of the image sensor is not limited to this. For example, the image sensor 104 may include a fisheye lens, and may have a circular image capture region.

Object Data

The format of the object data is not limited to the above-mentioned gonio-spectral reflection data. For example, more simplified data may be used as the object data, or more detailed data may be used as the object data, according to the processing mode and the performance of the display unit 102 or the image processing application 301. For example, the object data may be a function that can express gonio-spectral reflection, or may be a coefficient of a function. Also, the object data may be such that scattered reflection characteristics and mirror reflection characteristics of an object are recorded individually, and these characteristics may be individually modeled. Also, the object data may be spectroscopic gonio-spectral reflection data in which spectroscopic reflection data is recorded for each angle.

Furthermore, in the above example, the gonio-spectral reflection data indicates the reflectance for each of the R, G, and B color components, but the gonio-spectral reflection data does not have to be based on an RGB color space, and may be based on an XYZ color space, for example. In this case the output unit 307 may convert the gonio-spectral color reproduction image defined by the XYZ color space into an image defined by an RGB color space.

Nor does the object data need to be a planar image. For example, the object data can be 3D data or data having texture information. In this case the object data can be such that gonio-spectral reflection characteristics of the object surface are described. When 3D data is used as object data, incident light from the rear side of the display unit 102 can also be taken into account. Therefore, the expanded incident light map 901 can be expanded to the region of Z<0, and incident light from all the way around can be handled.

Acquisition of Observation Position

How the position of the observer is acquired is not limited to facial detection. Any method can be used to acquire the positional relation between the observer and the image display apparatus. For example, the observer may wear a marker on the head. This marker may be one that can be recognized by image processing, or may be one that can be recognized by some other position detection method. In this case, the position of the observer can be acquired by detecting the marker. Alternatively, the image display apparatus 101 may include a plurality of image sensors. In this case parallax can be used to calculate the position of the observer.

Nor are there limitations on how the primary observer is selected from among a plurality of observers. For instance, to acquire the distance from the image sensor 104 to the observer, a know technique used in camera auto-focusing can be used. If the image sensor 104 has an optical system with a fixed focal point, the distance may be estimated from the degree of blurring of the detected face. Further, the distance to the observer may be estimated on the basis of the size of the detected face. Alternatively, input designating the primary observer may be acquired from the user.

This technique for acquiring the distance from the image sensor 104 to the observer can also be utilized to acquire the distance from the image sensor 104 to the light source. In this case, the distance from the image sensor 104 to the light source may be the distance d from the image sensor 104 to the captured incident light map 801.

Incident Light Map

The shape of the above-mentioned captured incident light map 801 is not limited to being planar. Nor is the shape of the expanded incident light map 901 limited to being cuboid. For example, the captured incident light map 801 may be circular, and the expanded incident light map 901 may have a cylindrical shape having this captured incident light map 801 as part of its upper bottom face. Also, the image sensor 104 may have a fisheye lens. In this case, the expanded incident light map 901 may have a hemispherical shape that covers the surface side of the display unit 102, or all or part of the expanded incident light map 901 may be the captured incident light map 801.

Rendering

In Example 1, the surface of the display unit 102 was subjected to a non-glare treatment, but completely suppressing the reflection of external light by surface treatment is difficult to accomplish. Accordingly, the reflection of external light may be cancelled out by subjecting the display image to suitable image correction. To this end, previously acquired a BRDF or gonio-spectral reflection data for the surface of the display unit 102 can be used, for example. The rendering unit 306 in this case can calculate the amount of light reflected at the surface of the display unit 102 with respect to the incident light from the expanded incident light map 901. The output unit 307 may then subject the data displayed on the display unit 102 to image correction so as to cancel out the calculated amount of reflected light.

Other Embodiments

In Example 1, the image display apparatus 101 shown in FIG. 1 performed the processing, but the present invention can also be realized by using some other apparatus. For example, an ordinary computer equipped with a CPU and a memory can be used as the image display apparatus 101 in Example 1. Also, in Example 1 it was described that the image processing application 301 that ran on the image display apparatus 101 performed processing, but the processing in Example 1 can also be realized by using a dedicated apparatus. Such a dedicated apparatus may include one or more hardware elements that realize the theoretical configurations 302 to 307 of the image processing application 301. Also, the image processing apparatus according to the present invention may be a system made up of a plurality of devices.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-015705, filed Jan. 27, 2011, which is hereby incorporated by reference herein in its entirety.

What is claimed is:

1. An image processing apparatus that performs processing for an image display apparatus having a display unit and an image capture unit, the image processing apparatus comprising:
   an input unit configured to input object data including reflection characteristics of an object;
   an acquisition unit configured to acquire observation position data indicating an observation position of an observer to the display unit and light source data indicating a surrounding light source around the display unit, on the basis of image data captured by the image capture unit in real time, wherein the observation position data indicating the observation position of the observer is determined by facial detection; and
   a generation unit configured to generate image data, which includes the object placed on the display unit, on the basis of the object data, the observation position data, and the light source data, wherein the image data indicate the image which is observed at the observation position when light from the light source is reflected by the object.

2. The image processing apparatus according to claim 1, wherein the image capture unit is configured to capture image data, and
   wherein the display unit is configured to display image data generated by the generation unit.

3. The image processing apparatus according to claim 1, wherein the reflection characteristics include information indicating reflectance corresponding to the incidence angle of light.

4. The image processing apparatus according to claim 1, wherein when a plurality of faces have been detected in the facial detection, observation position data indicating the observation position of the observer is determined on the basis of the largest face.

5. The image processing apparatus according to claim 1, wherein data indicating the surrounding light source includes the direction and intensity value of the light source.

6. The image processing apparatus according to claim 1, wherein the generation unit is further configured to correct the image data so as to cancel out the reflection of incident light at the surface of the display unit.

7. The image processing apparatus according to claim 1, wherein the display unit has been treated with non-glare processing.

8. A storage medium that holds a computer program for having a computer function as various units of the image processing apparatus according to claim 1.

9. An image processing apparatus that performs processing for an image display apparatus having a display unit and an image capture unit, the image processing apparatus comprising:
- an input unit configured to input object data including reflection characteristics of an object;
- an acquisition unit configured to acquire observation position data indicating an observation position of an observer to the display unit and light source data indicating a surrounding light source around the display unit, on the basis of image data captured by the image capture unit in real time; and
- a generation unit configured to generate image data, which includes the object placed on the display unit, on the basis of the object data, the observation position data, and the light source data, wherein the image data indicate the image which is observed at the observation position when light from the light source is reflected by the object, wherein the generation unit is further configured to refer to the reflection characteristics, acquire reflectance corresponding to a direction going from the display unit to the light source and a direction going from the display unit to the observation position, and determine the luminance value of each pixel of the image data according to the intensity of the light source and the reflectance.

10. An image processing method for an image display apparatus having a display unit and an image capture unit, the image processing method comprising:
- inputting object data including reflection characteristics of an object;
- acquiring observation position data indicating an observation position of an observer to the display unit and light source data indicating a surrounding light source around the display unit, on the basis of image data captured by the image capture unit in real time, wherein the observation position data indicating the observation position of the observer is determined by facial detection; and
- generating image data, which includes the object placed on the display unit, on the basis of the object data, the observation position data, and the light source data, wherein the image data indicate the image which is observed at the observation position when light from the light source is reflected by the object.

* * * * *